Oct. 21, 1924.　　　　　　　　　　　　　　　　1,512,367
A. E. SANDEBERG
SUSPENSION DEVICE FOR STRIKING BAGS
Filed April 8, 1922
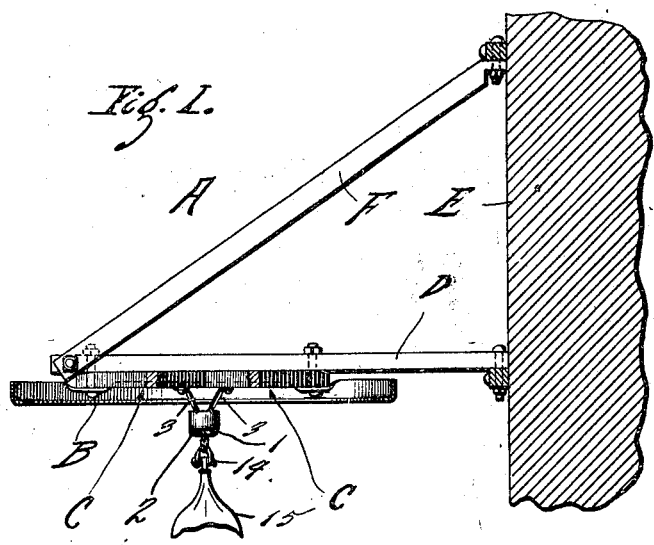
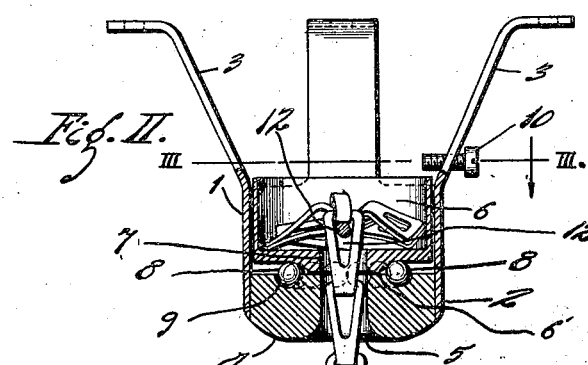
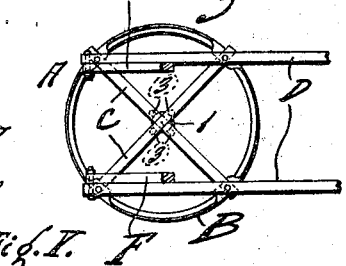
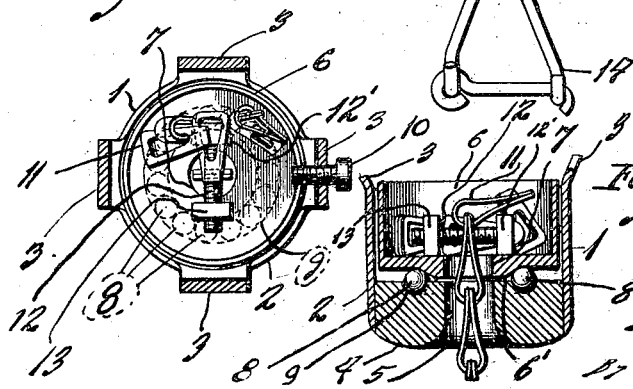
Inventor:
Ailie E. Sandeberg
by Cook & McCauley Attys.

Patented Oct. 21, 1924.

1,512,367

UNITED STATES PATENT OFFICE.

ALVIE E. SANDEBERG, OF ST. LOUIS, MISSOURI.

SUSPENSION DEVICE FOR STRIKING BAGS.

Application filed April 8, 1922. Serial No. 550,814.

*To all whom it may concern:*

Be it known that I, ALVIE E. SANDEBERG, a citizen of the United States of America, a resident of the city of St. Louis and State of Missouri, have invented certain new and useful Improvements in Suspension Devices for Striking Bags, of which the following is a full, clear, and exact description, reference being had to the accompanying drawings, forming a part of this specification.

This invention relates generally to improvements in suspension devices, and more particularly to a suspension device to be used in connection with a striking bag.

Prior to this invention a striking bag was suspended from its support by being attached to an end of a hempen suspension member, the other end of said suspension member being secured to said support. The suspension member of a striking bag, as is well known, is subjected to continual flexing and torsional twisting, and for this reason the life of the hempen suspension member heretofore used was very short.

To eliminate the annoyance of continually replacing broken suspension members, I provide my improved suspension device with a metallic suspension member, preferably in the form of a linked chain, whereby the difficulties mentioned above are eliminated.

Another object of the invention is to provide a means whereby the length of the suspension member may be easily regulated. Still another object of the invention is to provide a means whereby the metallic suspension member may be swiveled to the support, thus permitting free axial movement of said suspension member.

Fig. I is a sectional view of a striking bag supporting device showing my suspension device in place thereon, a portion of the striking bag being broken away.

Fig. II is a vertical section through the suspension device.

Fig. III is a section on the line III—III of Fig. II.

Fig. IV is a plan view, partly in section, of a striking bag supporting device, showing my suspension device in place thereon.

Fig. V is a vertical section of the suspension device.

In the drawing, A designates a striking bag supporting device which comprises a striking ring B secured to diagonal members C. The diagonal members C are secured, in any suitable manner, to horizontal bracing members D which are fixed to a permanent structure E. Bracing members F are secured to the permanent structure E at one of their ends, the opposite ends thereof being secured to the outer end of the horizontal bracing members D whereby the supporting device is given the required rigidity to withstand the vibration to which it is subjected.

Fixed to the diagonal members C and extending downwardly therefrom is my improved suspension device, which includes a stationary member 1 having a cup-shaped lower portion 2 and a plurality of legs 3 extending upwardly from said cup-shaped portion, said legs being provided with laterally extending portions which bear against the diagonal members C and are secured thereto by suitable fastening devices. The bottom 4 of the cup-shaped portion of the member 1 may be an integral part of said cup-shaped portion or a separate part secured to the side wall of said cup-shaped portion, and is provided with a central opening 5, the purpose of which will be subsequently pointed out.

Located within the cup-shaped portion 2 of the member 1 is a rotatable member 6, said rotatable member also being cup-shaped in vertical section and the bottom wall thereof being provided with a central opening 7 similar to the opening 5 in the bottom 4.

Interposed between the upper face of the bottom 4 of the cup-shaped portion 2 and the lower face of the bottom of the rotatable member 6 is a plurality of anti-friction balls 8, said bottom 4 being provided with a ball race-way 9 within which said balls are confined. By referring to Figs. II and V of the drawing it will be seen that the rotatable member 6 is provided with a downwardly extending portion 6' which is located within the circle of anti-friction balls 8 whereby said rotatable member 6 is prevented from moving laterally within the cup-shaped portion 2. The rotatable member 6 is of such diameter as to provide a space between the circumferential face of said member and the inside face of the side wall of the portion 2 of the member 1, and also the anti-friction balls 8 are of such size as to space the bottom face of the portion 6' away from the top face of the bottom 4 of the member 1, consequently said member 6 is free to rotate with very little friction.

To retain the rotatable member 6 in its position within the cup-shaped portion 2 of the member 1, I provide a set screw 10 which passes through one of the legs 3 and is positioned immediately above said member 6 whereby said member is prevented from moving upwardly for any great distance in said cup-shaped portion 2.

Extending through the openings 5 and 7 is a linked chain 11 which may be of any suitable design, such, for instance, as that shown in the drawing, a portion of said chain extending below the bottom 4 of the member 1 and a portion thereof being located within the rotatable member 6.

Inserted through one of the links of the chain 11 is a bolt 12, said bolt being of sufficient length to span the opening 7, a nut 12' located adjacent to the head of said bolt rests upon the top face of the bottom wall of the member 6 at one side of said opening 7 and a nut 13 located at the opposite end of said bolt resting on said bottom wall at the opposite side of said opening 7. From the foregoing it is plain that the chain 11 will be prevented from moving downwardly within the openings 5 and 7, and the nuts 12 and 13 on the bolt 12 will frictionally grip the bottom wall of the member 6 whereby said member 6 will be rotated in response to axial movement of said chain 11.

Secured to the lower end of the chain 11 is an attaching device 14 by which the striking bag 15 is secured to said chain.

In the use of my suspension device the rotatable member 6 will move in response to the slightest axial movement of the chain 11 and said chain, being formed of a plurality of links, will be equally as flexible as the hempen suspension member heretofore used.

To regulate the distance of the striking bag toward or away from the member 1 it is only necessary for the user to insert his fingers between the legs 3 of said member 1 and draw the chain 11 upwardly until the bolt 12 is above the upper edge of the rotatable member 6, when said bolt may be withdrawn from the link through which it extends and may then be inserted through another link closer to or further away from the attaching device 14 whereby the portion of the chain 11 which extends below the member 1 will be shortened or lengthened. After the chain 11 has been adjusted to the desired length, a uniform swing of the bag is maintained due to the fact that unlike the hempen suspending members already mentioned, which will stretch and which are provided with knots that may slip, the length of my suspending member is fixed.

I claim:

1. A suspension device for striking bags comprising a stationary member having a cup-shaped portion comprising a bottom wall and an annular side wall, a rotatable cup-shaped member within said cup-shaped portion of said stationary member, said rotatable member comprising a bottom wall and an annular side wall, anti-friction devices interposed between said rotatable member and said stationary member for permitting free movement of said rotatable member relative to said stationary member, and a suspending member associated with said rotatable member.

2. A suspension device for striking bags comprising a stationary member having a cup-shaped portion comprising a bottom wall and an annular side wall, a rotatable cup-shaped member within said cup-shaped portion of said stationary member, said rotatable member comprising a bottom wall and an annular side wall, said bottom wall of said cup-shaped portion of said stationary member and said bottom wall of said rotatable member being provided with openings of equal diameters which register with each other, anti-friction devices interposed between said rotatable member and said stationary member for permitting free movement of said rotatable member relative to said stationary member, and a suspending member, one end portion of which passes through said openings in the walls of said rotatable member and said stationary member and the other end portion of which is attached to a striking bag.

3. A suspension device for striking bags comprising a stationary member having a cup-shaped portion comprising a bottom wall and an annular side wall, a member on said stationary member whereby said cup-shaped portion thereof is spaced apart from the article to which said stationary member is attached, a rotatable cup-shaped member within said cup-shaped portion of said stationary member, said rotatable member comprising a bottom wall and an annular side wall, said bottom wall of said cup-shaped portion of said stationary member and said bottom wall of said rotatable member being provided with openings of equal diameters which register with each other, anti-friction devices interposed between said rotatable member and said stationary member for permitting free movement of said rotatable member relative to said stationary member, and a suspending member, one end portion of which passes through said openings in the walls of said rotatable member and said stationary member and the other end portion of which is attached to a striking bag.

4. A suspension device for striking bags comprising a stationary member having a cup-shaped portion comprising a bottom wall and an annular side wall, a plurality of legs formed integral with said stationary member whereby the cup-shaped portion thereof is spaced apart from the article to which said stationary member is attached, a rotatable cup-shaped member within said cup-shaped portion of said stationary member, said rotatable member comprising a bottom wall and an annular side wall, said bottom wall of said cup-shaped portion of said stationary member and said bottom wall of said rotatable member being provided with openings of equal diameters which register with each other, anti-friction devices interposed between said rotatable member and said stationary member for permitting free movement of said rotatable member relative to said stationary member, and a suspending member, one end portion of which passes through said openings in the walls of said rotatable member and said stationary member and the other end portion of which is attached to a striking bag.

5. A suspension device for striking bags comprising a stationary member having a cup-shaped portion comprising a bottom wall and an annular side wall, a rotatable cup-shaped member within the cup-shaped portion of said stationary member, said rotatable cup-shaped member comprising a bottom wall and an annular side wall, said bottom wall of said cup-shaped portion of said stationary member and said bottom wall of said rotatable member being provided with openings of equal diameters which register with each other, anti-friction devices for permitting the free movement of said rotatable member relative to said stationary member, a strikng bag suspending member comprising a plurality of links connected together, an end portion of said suspending member being extended through said registering openings, and means extending through one of said links and engaging said rotatable member for regulating the suspended length of said suspending member.

In testimony that I claim the foregoing I hereunto affix my signature.

ALVIE E. SANDEBERG.